US012640359B2

(12) United States Patent
Repp et al.

(10) Patent No.: US 12,640,359 B2
(45) Date of Patent: May 26, 2026

(54) CAPACITIVE COUPLING COMPENSATION FOR DIRECT CURRENT ELECTRODES IN ION TRAPS

(71) Applicant: Infineon Technologies Austria AG, Villach (AT)

(72) Inventors: Jens Repp, Markt Schwaben (DE); Yves Colombe, Villach (AT); Wolfgang Furtner, Unterhaching (DE); Michael Sieberer, Graz (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 338 days.

(21) Appl. No.: 18/328,164

(22) Filed: Jun. 2, 2023

(65) Prior Publication Data

US 2024/0404820 A1 Dec. 5, 2024

(51) Int. Cl.
*H01J 49/42* (2006.01)

(52) U.S. Cl.
CPC ........ *H01J 49/4285* (2013.01); *H01J 49/422* (2013.01)

(58) Field of Classification Search
CPC ............................ H01J 49/4285; H01J 49/422
See application file for complete search history.

(56) References Cited

U.S. PATENT DOCUMENTS

2007/0040113 A1 2/2007 Monroe et al.
2011/0290995 A1* 12/2011 Kumph ............... H01J 49/0018 250/282
2022/0037313 A1 2/2022 Deen et al.

FOREIGN PATENT DOCUMENTS

WO 2019088403 A1 5/2019

OTHER PUBLICATIONS

Kaushal, V. et al., "Shuttling-Based Trapped-Ion Quantum Information Processing," AVS Quantum Science, 014101 (2020); https://doi.org/10.1116/1.5126186, Submitted: Aug. 30, 2019 . Accepted: Jan. 28, 2020, Published Online: Mar. 4, 2020, 25 pages.

* cited by examiner

*Primary Examiner* — Nicole M Ippolito
(74) *Attorney, Agent, or Firm* — SLATER MATSIL, LLP

(57) ABSTRACT

An ion trap system and method of using an ion trap system, the system including a substrate, a radio frequency (RF) source configured to provide an RF signal, an RF electrode disposed in the substrate and connected to the RF source, a direct current (DC) source configured to provide a DC signal, a DC electrode disposed in the substrate and connected to the DC source, wherein the DC electrode is separate from the RF electrode, and a coupling compensation system configured to provide a compensating RF signal associated with the RF signal.

21 Claims, 10 Drawing Sheets

CAPACITIVE COUPLING COMPENSATION FOR DIRECT CURRENT ELECTRODES IN ION TRAPS

TECHNICAL FIELD

The present disclosure relates generally to a system and method for accurately controlling and moving ions in an ion trap, and, in particular embodiments, to a system and method for providing a compensation for capacitive coupling between control electrodes in ion movement trap systems.

BACKGROUND

Generally, ion traps may be used as ion shuttling systems in trapped ion quantum computing, with ions used as qubits for computation, and the excitation state of an electron indicating a logical value or logic state, or as atomic clock systems. Ions such as barium (Ba), magnesium (Mg), calcium (Ca), beryllium (Be), or the like, may be positively charged, and an electron of the ion may be used as the logic element. Two or more ions may be entangled, providing substantial speed and power savings over conventional computing. Additionally, ion traps may be used in atomic clocks, where the vibration of the ions' internal state is used as a frequency reference, for example for the definition of a second.

However, ion traps require a well-controlled environment, and precise handling of the ions. Ions in an ion trap are trapped or controlled using a radio frequency (RF) electrical field. Additionally, direct current (DC) electrical fields may be provided by DC electrodes separate from RF electrodes, with the DC fields used to control or move the trapped ions. The use of both RF and DC electrical fields through different electrodes may results in capacitive coupling between the DC electrodes and RF electrodes, effectively attenuating, or otherwise interfering with, the DC signals provided at the DC electrodes. In order to provide the desired DC and RF fields for precise control of ions, interference with the RF and DC fields should be eliminated to the greatest possible extent.

SUMMARY

An embodiment ion trap system includes a substrate, a radio frequency (RF) source configured to provide an RF signal, an RF electrode disposed in the substrate and connected to the RF source, a direct current (DC) source configured to provide a DC signal, a DC electrode disposed in the substrate and connected to the DC source, wherein the DC electrode is separate from the RF electrode, and a coupling compensation system configured to provide a compensating RF signal associated with the RF signal.

An embodiment system includes a radio frequency (RF) electrode configured to provide an RF field in response to a received RF signal, where the RF field is configured to confine an ion, a direct current (DC) source configured to provide a DC signal, where the DC signal is configured to perform at least one of controlling or moving the ion, a coupling compensation system configured to provide a compensating RF signal associated with the RF signal, and a DC electrode connected to the coupling compensation system and connected to the DC source, where the DC electrode is separate from the RF electrode, and where the DC electrode is configured to provide a DC field according to the compensating RF signal and further according to the DC signal, and where the DC field is compensated, according to the compensating RF signal, for a capacitive coupling between the RF electrode and the DC electrode induced by the RF field.

An embodiment method includes applying a radio frequency (RF) field to an RF electrode to contain an ion in an ion trap system, determining a target direct current (DC) electrode of the ion trap system, determining a compensating RF signal associated with the RF signal, generating the compensating RF signal, applying the compensating RF signal to the target DC electrode wherein the compensating RF signal results in a DC field that is compensated for capacitive coupling between the RF electrode and the target DC electrode, and performing, using the compensating RF signal, at least one of controlling or moving an ion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
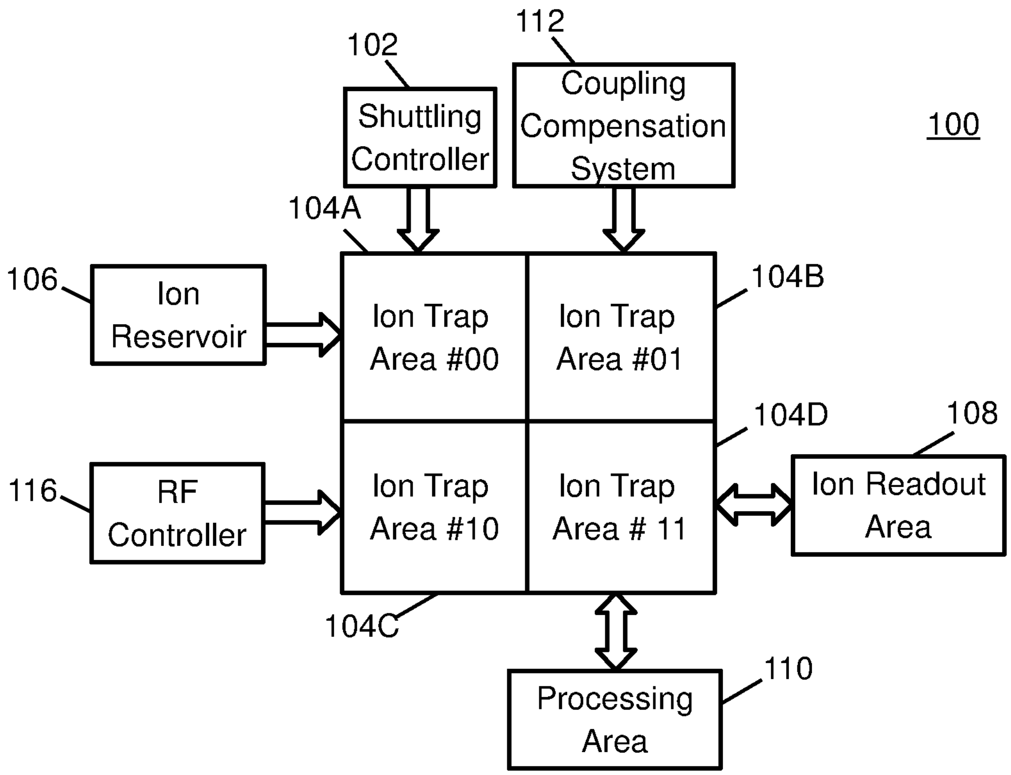
FIG. 1 is a logical diagram illustrating an ion trap system with a coupling compensation system according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. More-over, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as “above,” “below,” “upper,” “lower,” or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Ion trapping is a promising candidate for quantum computing, atomic clocks, and other technologies dependent on isolating single ions. In a trapped ion quantum computing system, electrostatic potentials are used to move ions between storage and processing locations in a process called ion shuttling. Similarly, electrostatic potentials are used in atomic clocks to trap and control an ion, with properties of the ion used to define the length of a second. In order to control these potentials, hundreds, or even thousands, of electrodes must be simultaneously controlled in order to provide the desired electrical field (E-field).

A system for ion shuttling may use a limited number of digital-to-analog converters (DACs) that are multiplexed to a large number of electrodes in a multidimensional array. A multidimensional ion shuttling system provides for shuttling of multiple ions in multiple different directions simultaneously using the same DACs to avoid the cost, power requirements, and necessary die space associated with a one-to-one DAC-to-electrode arrangement.

The use of numerous DC electrodes at the same times as multiple RF electrodes that provide RF containment fields results in capacitive coupling between the DC electrodes and the RF electrodes. However, while filter capacitors between a DC electrode and ground may filter some RF signals to reduce the induced capacitive coupling, the size of filter capacitors required for large scale applications makes filter capacitors impractical to scale. Using active capacitive coupling compensation instead of filter capacitors may provide for a more fine-tuned and adjustable coupling compensation with more complete coupling reduction and improved scalability.

FIG. 1 is a logical diagram illustrating an ion trap system 100 with a coupling compensation system 112 according to some embodiments. The system 100 has one or more ion trap areas 104A-104D that include ion shuttling systems, and which are configured to shuttle ions between target areas such as an ion reservoir 106, ion read-out area 108, and other areas such as ion disposal areas (not shown), processing areas 110, and between the ion trap areas 104A-104D. The system 100 may also have one or more shuttling controllers 102 electrically connected to the ion shuttling systems of the ion trap areas 104A-104D to control movement of ions. The shuttling controllers 102 switch voltages to elements of the ion trap areas 104A-104D to provided DC voltages that create voltage profiles for moving the ions.

While the system 100 is illustrated with four ion trap areas 104A-104D and one shuttling controller 102 with the ion trap areas 104A-104D in a symmetrical arrangement, the system 100 is not limited to such an arrangement. The shuttling controller 102 provides addressable voltage control of electrodes, and is, therefore, configured to control any number of cascaded ion trap areas 104A-104D, in any arrangement.

Additionally, the shuttling controller 102 may be provided as a unitary controller, with a single controller, or multiple shuttling controllers 102, controlling any number or size of the ion trap areas 104A-104D. The ion trap areas 104A-104D may also be cascaded so that additional ion trap areas 104A-104D and shuttling controllers 102 may be connected to existing ion trap areas 104A-104D and shuttling controller 102 to expand the shuttling area, number of ions controlled, and capabilities of the system 100. The shuttling controller 102 may address one or more DC electrodes for controlling positioning or movement of an ion in the ion trap areas 104A . . . 104C. Additionally, any of the ion reservoir 106, ion read-out area 108, ion disposal areas, processing areas 110, or other ion system parts may also have ion shuttling systems or movement control systems with DC electrodes for controlling positioning or movement over an ion, and these additional DC electrodes may be controlled by the shuttling controllers, 102, or by another control system.

The system 100 may have a RF system with an RF controller 116 that provides an RF containment field separately from the DC bias of the DC electrodes and other compensation electrodes. The RF field may be provided by electrodes that are separate from electrodes used to provide a shuttling or keeping voltage fields or compensation voltage fields. In some embodiments, the RF field may be operated at around 200 volts, and 20 megahertz (MHz), and the DC fields may be provided locally and separately to shuttle ions being contained by the RF field.

In order to prevent the RF field provided by the RF controller 116 such as, for example, a directly connected RF resonator, from interfering with DC fields provided by the shuttling controller 102 or other DC signal or voltage source, a coupling compensation system 112 may be provided to modify voltages on one or more DC electrodes to compensate for capacitive coupling between RF electrodes and DC electrodes. In some embodiments, a compensation RF signal that is out of phase with the containment RF signal provided by the RF controller 116 may be provided on one or more DC electrodes to provide a DC field at the respective DC electrode with a net DC field that omits, avoids, or at least reduces, RF components induced by the capacitive coupling between the RF and DC electrodes.

Figure 2:
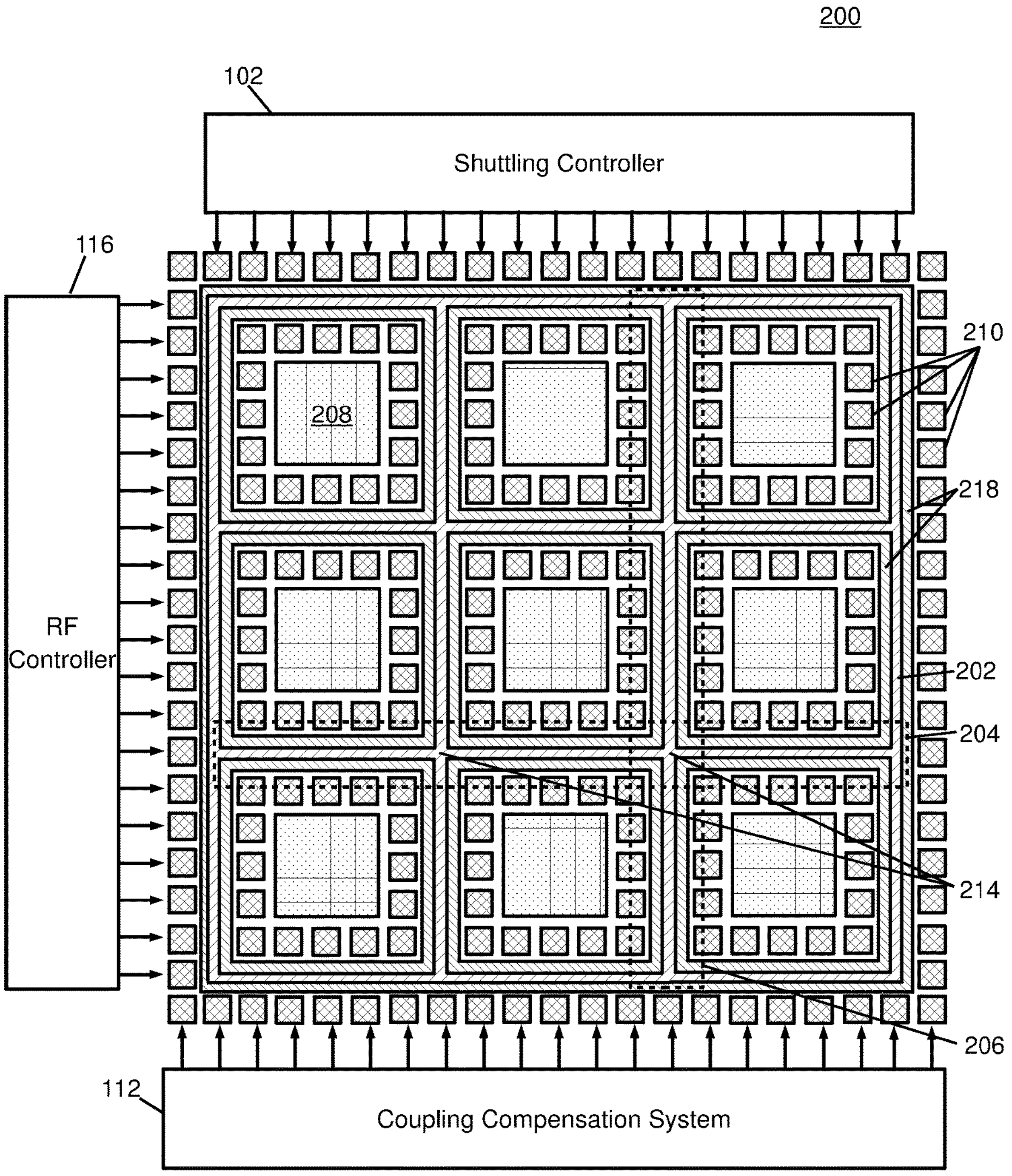
FIG. 2 is a logical diagram illustrating an ion shuttling system with capacitive coupling compensation according to some embodiments.

FIG. 2 is a diagram illustrating an ion shuttling system 200 according to some embodiments. The ion shuttling system 200 may include a shuttling controller 102 connected to DC electrode 210 such as a confinement, compensation or shuttling electrode. The DC electrodes 210 may be arranged in a two-dimensional pattern, or in another arrangement with one dimension, or in three dimensions for layered patterns.

The ion shuttling system 200 may also have additional electrodes such as RF electrodes 218 adjacent to, or between, the DC electrodes 210 and other electrodes such as lane elements 202, ground electrodes, compensation electrodes, sensors electrodes, or the like. In some embodiments, the system 200 may have lane elements 202 along which an ion may be shuttled. The shuttling controller 102 provides a DC biasing voltage to the DC electrodes 210 to move and steer ions along shuttling lanes 204, 206. The shuttling controller 102 provides a voltage to each DC electrode 210, and the provided voltage may be connected though a filtering switch so that the voltage is filtered as it is turned on. The voltage at each DC electrode 210 may be set or held by a latch, capacitor, or the like, associated with the respective DC electrode 210, or may be continuously provided with a transient signal or other signal having an RF or AC component for compensation of capacitive coupling.

The shuttling controller 102 may address an individual electrode element, which includes the latch and DC electrode 210 itself, and may provide a DC voltage signal or other signal to set the voltage for a particular DC electrode 210. In some embodiments, the DC voltage may be held by the DC electrode's 210 associated latch. Thus, each DC electrode 210 may be addressed individually, and have a specific voltage applied.

In some embodiments, the shuttling controller 102 addresses the individual DC electrodes 210 using an electrode control or addressing system, which controls application of a voltage to the DC electrodes 210. Thus, the DC electrode 210 in a particular column and row may have a DC voltage that is set by routing a voltage controlled by a DAC to a latch or storage element, such as a capacitor for the respective DC electrode 210, so that the electrode latch or storage element sets the voltage at the DC electrode 210.

However, in some embodiments, a coupling compensation system 112 may provide an AC or RF voltage that acts as a compensation RF signal for one or more of the DC electrodes 210 to compensate for capacitive coupling between the respective DC electrode 210 and one or more RF electrodes 218. The coupling compensation system 112 may add the compensation RF signal to the DC signal to create an output signal at the DC electrodes 210 that has a DC component and an AC component. In other embodiments, the coupling compensation system 112 may have auxiliary electrodes (not shown) associated with respective DC electrodes 210. The coupling compensation system 112 may provide an RF signal to the auxiliary electrodes to advantageously create a compensation capacitive coupling between the auxiliary electrode and respective DC electrode to compensate for the incidental capacitive coupling between the DC electrode 210 and RF electrode 218. In some embodiments, the coupling compensation system 112 may set the phase and amplitude of the compensating RF signal based on location of the DC electrode 210 to which the compensating RF signal is being applied, so that the compensating RF signal may be varied or tailored to provide a specific compensating RF field for different DC electrodes 210. For example, an amplitude of the compensating RF field may be based on a distance between the DC electrode 210 and the RF electrode 218.

In other embodiments, an RF field generated by voltages applied to the RF electrodes 218 may hold an ion in a controlled position relative to the electrodes, or over a lane element 202, where present. The DC shuttling field provided by DC electrodes 210 causes the ion to move along the electrodes or lane elements 202. In some embodiments, movement or shuttling of the ion is performed by setting a DC voltage on an electrode to create DC bias in the E-field, with the DC bias allowing control of the position of an ion along, or parallel to, the lane 204.

The voltages provided to the DC electrodes 210 may be provided by DC sources such as DACs that provide a voltage or voltage profile to one or more DC electrodes 210. However, as the ion moves past DC electrodes 210, different voltage profiles from different DACs may be needed on a particular electrode. This can be performed by using multiplexers or other switching or addressing to switch DACs supplying the voltage to a particular DC electrode 210.

Changing the shuttling voltage on the DC electrodes 210 permits control of the movement of the ion, and ions may be moved along shuttling lanes 204, 206. Additionally, positioning of an electrode within a lane 204, 206 relative to the DC electrodes 210 and RF electrodes 218 may be provided by differential DC voltages applied across a lane to laterally shift an ion.

The shuttling lanes 206, 204 may be arranged so that shuttling lanes 204, 206 cross to form intersections 214 to allow for switching an ion onto different shuttling lanes 204, 206 for two dimensional movement. The DC electrodes 210 may be arranged so that free space is created between the DC electrodes 210, and shield elements 208 may be provided to shield the DC electrodes 210 and ions located in shuttling lanes 204, 206 from voltages provided for other ions in other locations along the shuttling lanes 204, 206. Such an arrangement may reduce cross-talk between ions in the ion shuttling system 200 and simplify production of the ion shuttling system 200. Additionally, while the shuttling lanes 204, 206 and DC electrodes 210 are arranged in FIG. 2 in a symmetrical pattern, the DC electrodes 210 and shuttling lanes 204, 206 are not limited to such an arrangement, as any arrangement in two dimensions may be provided, including an arrangement where shuttling lanes 204, **20*s*6 intersect or cross at non-right angles. Shuttling lanes 204, 206 are not limited to crossing each other, as the shuttling lanes 204, 206** may form a three way, or 'T' intersection, or may form a turn or angle, such as an 'L' shaped intersection.

Figure 3:
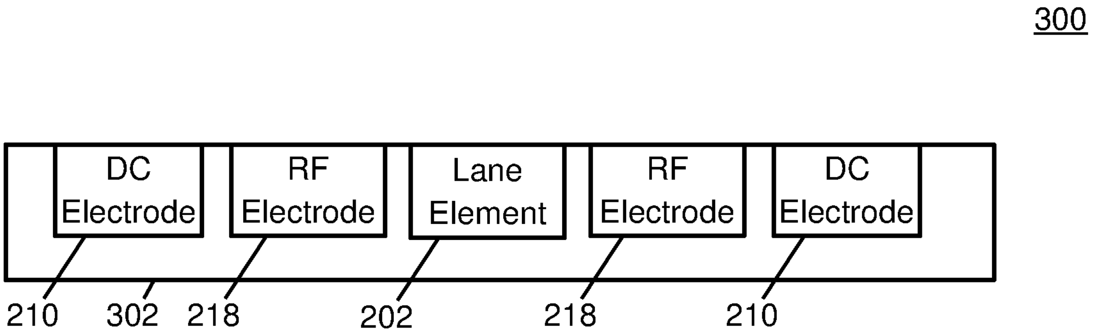
FIG. 3 is a diagram illustrating a relationship between electrodes in an ion trap system according to some embodiments.

FIG. 3 is a diagram illustrating a relationship between electrodes in an ion trap system 300 according to some embodiments. The ion trap system 300 may have elements formed on a substrate 302. In some embodiments, elements of the ion trap system 300 may be formed using semiconductor packaging or fabrication techniques, for example, by depositing conductive material on the substrate 302 and forming electrodes, lane elements, shields, connectors, and the like, in, for example, glass or oxide layers. Additionally, connection layers (not shown), such as layers of conductive wiring, may be formed as a stack or on the backside of the system to provide connections to control elements such as electrodes, multiplexers, DACs, and the like. One or more other devices, such as transistors, or logic gates, or other circuits may also be formed or located on the surface of the substrate 302, on the backside of the substrate 302, on the wiring layers, or the like, to permit integration of the system elements into a package or system-on-chip (SoC). Additionally, any analog or digital circuit may be integrated with the passive part of the ion trap system consisting of electrodes and wiring, and integration may be done on the same substrate or using stacked dies.

In the ion trap system, one or more metal elements may be formed in a metallization layer, for example, using a damascene etch-and-fill process. The metallization layer may have one or more substrates such as insulator layers, that may be, for example, silicon dioxide, glass, or other insulating materials. In some embodiments, elements such as RF electrodes 218, confinement, shuttling, or DC electrodes 210, shield elements 208, lane elements 212, magnetic coils, or the like, may be formed in the metallization layers, and may be a conductive material such as copper, aluminum, gold, a metal alloy, ceramic or silicide, or another conductive material. Additionally, while not shown, connecting wiring may be provided in one or more additional metallization layers or insulator layers to connect the elements to each other or to other elements, such as switches, controllers, DACs, or the like.

In some embodiments, RF electrodes 218 may be disposed adjacent to a lane element 202 such as an RF ground, or the like, and adjacent to a DC electrode 210. Thus, the RF electrode 218 may be disposed between the lane element 202 and an associated DC electrode 210. Additionally, the ion trap system 300 may have multiple RF electrodes 218. For example, the ion trap system may have two RF electrodes 218, associated with a particular lane element 202 or portion of a lane element 202, and with one or more RF electrodes 218 disposed one each side of the lane element 202.

Figure 4A:
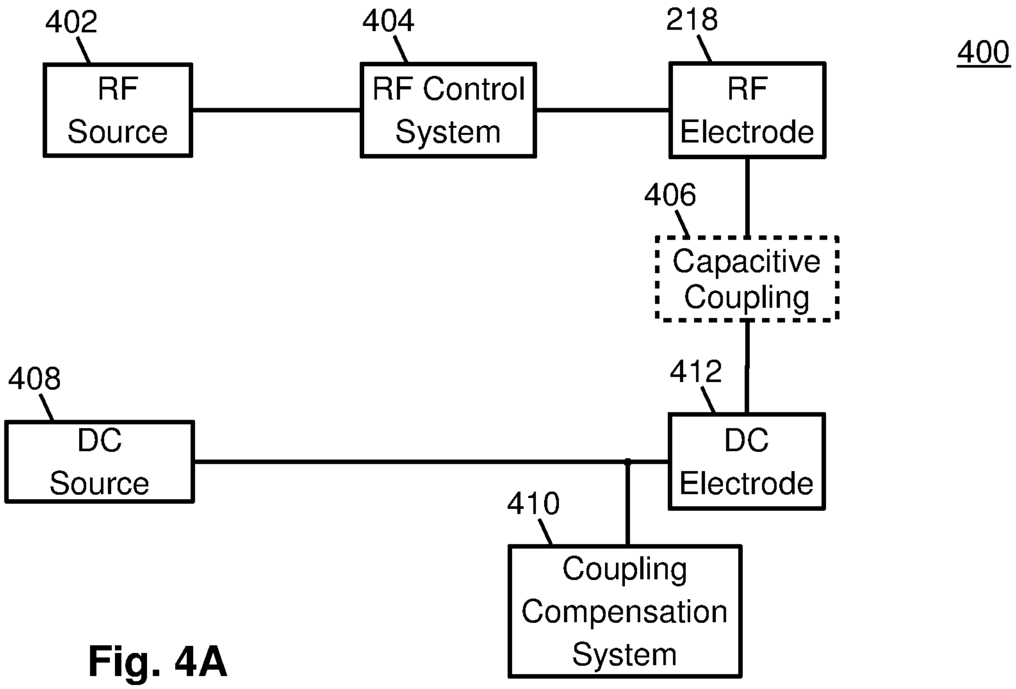
FIGS. 4A and 4B are a logical diagrams illustrating electrode arrangements with coupling compensation systems according to some embodiments.

FIG. 4A is a logical diagram illustrating an electrode arrangement 400 with a coupling compensation system 410 according to some embodiments. In some embodiments, an RF source 402 generates an RF signal, and the RF signal is routed to an RF electrode 218 by an RF control system 404. In some embodiments, the RF control system 404 may be one or more switches, DACs, multiplexers, or the like, that switch the RF signal to one or more selected RF electrodes 218. In other embodiments, the RF control system 404 may control characteristics of the RF signal, such as the phase, or amplitude of the signal according to characteristics of the ion being contained. For example, the RF control system 404 may adjust the RF signal strength to create a stronger or weaker RF field in certain areas of an ion trap, or may adjust RF signal strength according to the position of the ion, heating or motion of the ion, or the like. In other embodiments, the RF source 402 may connect directly to the RF electrode 218 without an RF control system 404.

The electrode arrangement 400 may further have a DC source 408 that provides a DC voltage to an associated DC electrode. The DC voltage may be routed to an identified DC electrode 412, for example, by a switching system, routing system, or other system for connecting a particular DC source 408 to one or more selected DC electrodes 412. The DC source 408 may be, for example, a DC voltage generator, a DAC, or the like, and may provide a constant, transient, or variable DC voltage to the DC electrode. However, the proximity of the RF electrode 218 to the DC electrode 412 may result in parasitic capacitive coupling 406 between the RF electrode and then DC electrode 412.

A coupling compensation system 410 may be connected to the DC electrode 412 to provide a signal that compensates for the capacitive coupling 406. In some embodiments, the coupling compensation system 410 is an active compensation system that provides or generates an RF or AC signal to the DC electrode that at least partially cancels, attenuates or compensates for the capacitive coupling 406. Thus, the coupling compensation system 410 may provide an AC or RF signal that is associated with the RF signal provided by the RF source. For example, the coupling compensation system 410 may provide a compensating RF signal that mirrors, but is 180 degrees out of phase with, the RF signal provided by the RF source 402. This provides destructive interference between the RF signal and the compensating RF signal so that the DC electrode 412 provides a DC field that is a result of the DC signal alone without the capacitive coupling 406 (or at least with attenuated capacitive coupling). In other embodiments, the coupling compensation system 410 may provide the compensating RFG signal and attenuate the compensating RF signal to adjust the destructive interference between the compensating RF signal and the RF signal from the RF source 402. Thus, where the RF signal from the RF source 402 causes capacitive coupling 406 with a particular capacitance, the coupling compensation system 410 may provide a compensating RF signal that is different from, but associated with, the RF signal, and that compensates for the actual capacitive coupling 406.

Figure 4B:
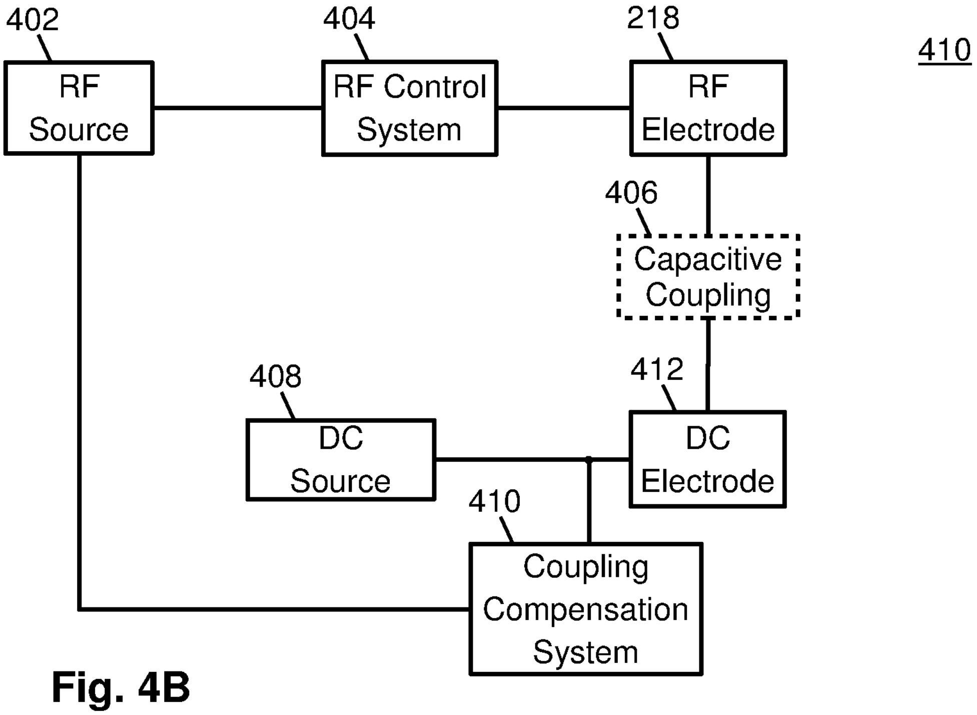

FIG. 4B is a logical diagram illustrating an electrode arrangement 400 with a coupling compensation system 410 connected to the RF source 402 according to some embodiments. In some embodiments, the coupling compensation system 410 may provide a compensation signal that is taken from, generated according to, or that is provided by, the RF source 402. Therefore, the RF source 402 may avoid the need to an additional resonator or RF source. For example, the coupling compensation system 410 may have an electrical connection that connects one the RF source, or a portion of the RF source 402 to the DC electrode, or that combines the DC signal with the compensating signal to provide the compensated signal to the DC electrode 412. In some embodiments, the coupling compensation system 410 may select an appropriate RF signal from a plurality of RF signals provided by the RF source 402 to selectively provide a compensating RF signal to the DC electrode 412.

Figure 5A:
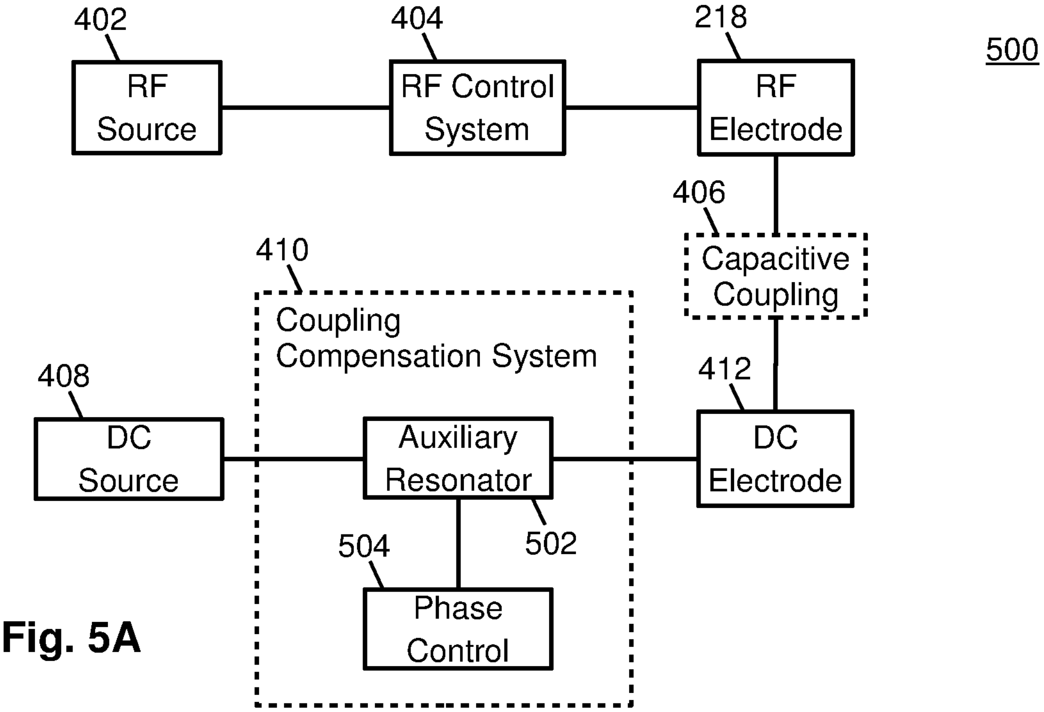
FIGS. 5A and 5B are logical diagrams illustrating electrode arrangements with coupling compensation systems according to some embodiments.

For example, an RF source may provide 2 signals that are 180 degrees out of phase with each other, with a first signal provided to a first RF electrode, and a second signal provided to a second RF electrode. The second signal may be 180 degrees out of phase with the first signal, with the two RF electrodes on opposite sides of an ion containment area. The out-of-phase RF signals are applied on opposite side of the ion to contain the ion. Since the RF source provides two different out of phase signals, a signal be selected to compensate for a disturbing signal. Thus, for compensation for coupling caused by, for example, the first RF electrode, a compensating signal may be the first RF signal that is phase shifted to generate the compensating signal, or may be the out-of-phase second RF applied to the second electrode, avoiding the need to phase shift any signal to generate the compensating signal. FIG. 5A is a logical diagram illustrating an electrode arrangement 500 with an auxiliary resonator 502 coupling compensation system 410 according to some embodiments. The coupling compensation system 410 may include an auxiliary resonator 502 in series with a DC source 408 so that the signal provided to the DC electrode 412 has both a DC component and an AC component. A phase control element 504 may keep the signal at the DC electrode 412 phase locked with the RF signal provided by the RF source to the RF electrode 218. Thus, the auxiliary resonator may provide an AC or RF signal that is associated with the RF signal provided by the RF source 402. In some embodiments, the phase control element 504 monitors the RF signal from the RF source 402, and sets the phase of the compensating RF signal provided by the auxiliary resonator 502. For example, the phase control element 504 may be a phase locked loop, or a phase detector that drives a voltage controlled oscillator auxiliary resonator 502.

The coupling compensation system 410 may further control the compensating RF signal according to the RF signal provided by the RF source 402, according to the capacitive coupling 406, or according to other circuit parameters. For example, the amplitude of the compensating RF signal may be determined during, manufacturing or testing of the electrode arrangement 500 or ion trap system. This may permit use of a fixed compensating RF signal, and the circuit can be tuned to provide a predetermined compensating RF signal at the auxiliary resonator 502.

Figure 5B:
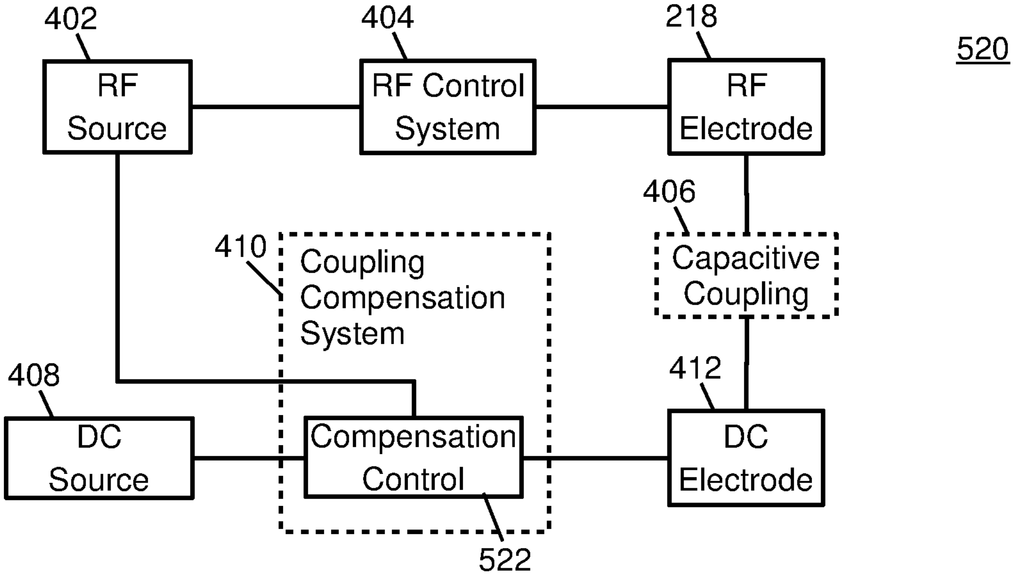

FIG. 5B is a logical diagram illustrating an electrode arrangement 520 with a coupling compensation system 410 according to some embodiments. In some embodiments, the coupling compensation system 410 may use an RF signal from the RF source 402 and avoid using an auxiliary resonator. The coupling compensation system 410 may include a compensation control element 522 having connections, switching circuits, or the like, that selectively connect at least one RF signal from the RF source 402 to the DC electrode. The RF signal from the RF source 402 may act as the compensating RF signal, and the compensation control element 522 may select or connect a selected RF signal from the RF source to compensate for an identified interfering RF signal. In other embodiments, the compensation control could adapt the RF signal from the RF source 402 by modifying a phase of the RF signal from the RF signal and/or an amplitude of the RF signal to generate the compensating RF signal.

Figure 6A:
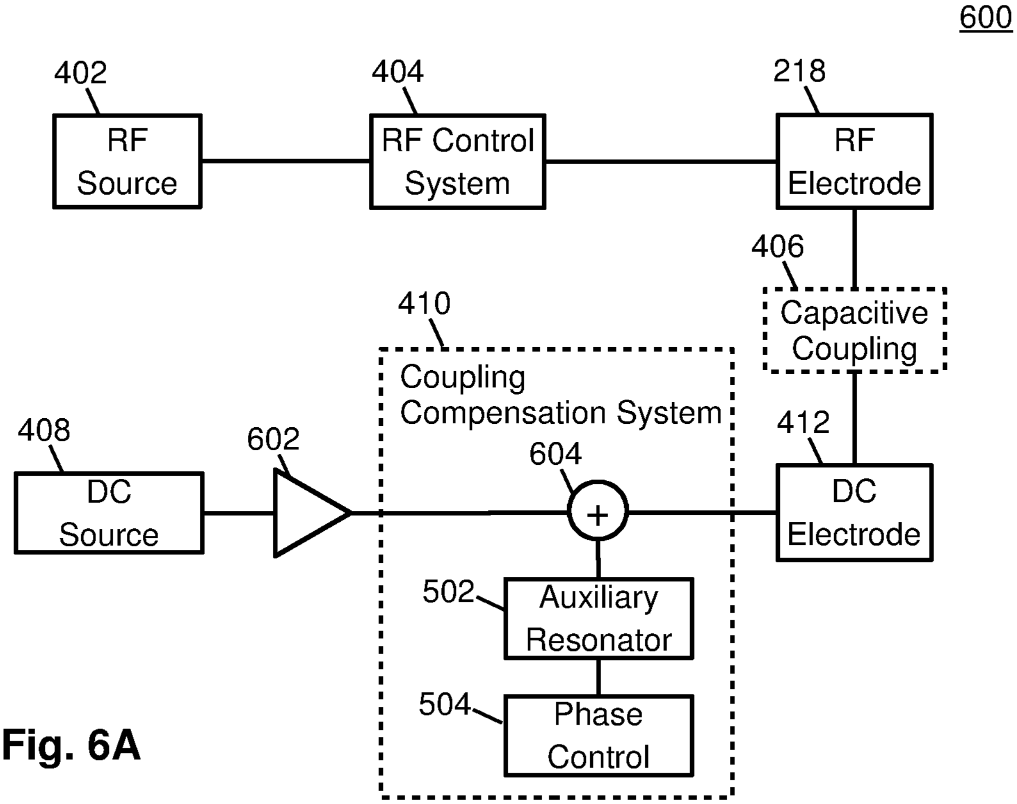
FIGS. 6A and 6B are a logical diagrams illustrating electrode arrangements with a bias tee coupling compensation system according to some embodiments.

FIG. 6A is a logical diagram illustrating an electrode arrangement 600 with a bias tee 604 coupling compensation system 410 according to some embodiments. A bias tee 604 may have components, such as capacitive elements, or a combination of capacitive and inductive elements, that permit combination of DC and AC signals so that a DC voltage signal may be provided to the DC electrode 412 with an AC or RF component for compensation for the capacitive coupling 406. As discussed above, the auxiliary resonator 502 provides the compensating RF signal, with the phase of the compensating RF signal controlled or set by the phase control element 504, and the amplitude set to a predetermined value. Using the bias tee 604 permits use of an amplifier 602 that amplifies the DC signal from the DC source 408 without the amplifier 602 having to drive the capacitive load or the compensating RF signal. Additionally, a bias tee 604 after the amplifier 602 avoids phase shifting of the compensating RF signal by the amplifier 602. While not shown, each DC electrode 412 may have a variable capacitor that filters the signal provided to the DC electrode 412.

Figure 6B:
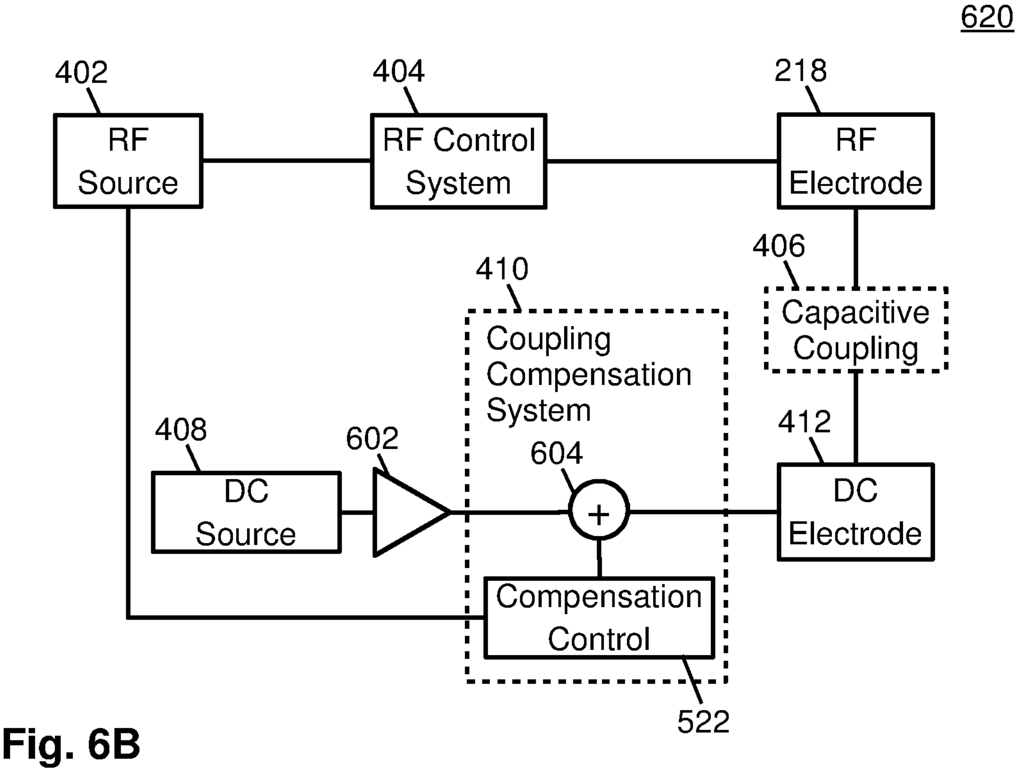

FIG. 6B is a logical diagram illustrating an electrode arrangement 620 with a coupling compensation system 410 according to some embodiments. In some embodiments, the coupling compensation system 410 may use an RF signal from the RF source 402 and avoid using an auxiliary resonator. The coupling compensation system 410 may include a compensation control element 522 having connections, switching circuits, or the like, that selectively connect at least one RF signal from the RF source 402 through the bias tee to the DC electrode. Thus, the RF signal from the RF source 402 may act as the compensating RF signal, and the compensation control element 522 may select or connect a selected RF signal from the RF source to compensate for an identified interfering RF signal. In other embodiments, the compensation control could adapt the RF signal from the RF source 402 by modifying a phase of the RF signal from the RF signal and/or an amplitude of the RF signal to generate the compensating RF signal.

Figure 7:
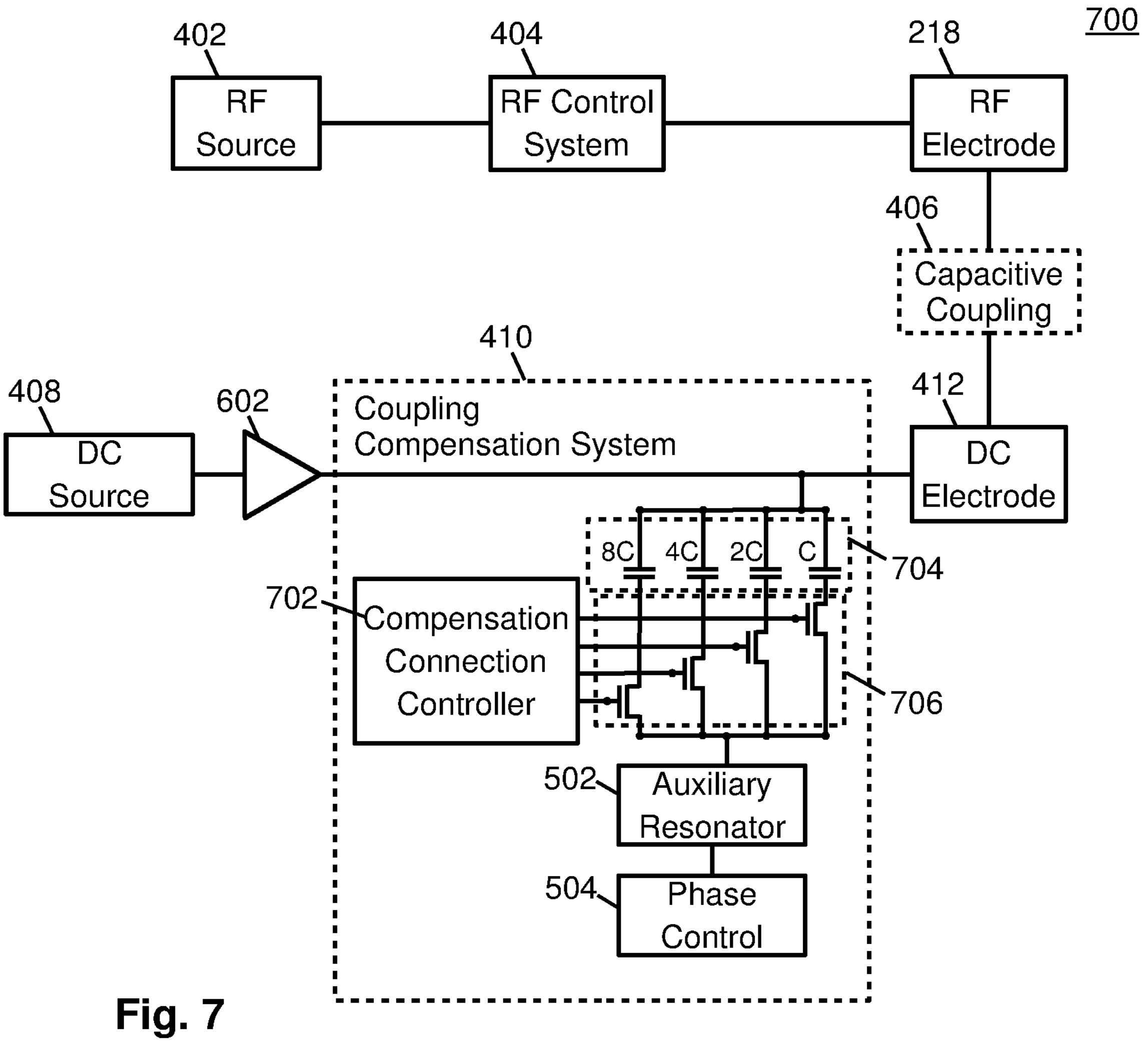
FIG. 7 is a logical diagram illustrating an electrode arrangement with a switched coupling compensation system according to some embodiments.

FIG. 7 is a logical diagram illustrating an electrode arrangement 700 with a switched coupling compensation system 410 according to some embodiments. In some embodiments, the coupling compensation system 410 has a switching matrix 706 that connects the auxiliary resonator 502 to the DC electrode 412 through one or more capacitors of a capacitor bank 704. The capacitor bank 704 may have capacitors with different capacitance values to attenuate the RF signal generated by the auxiliary resonator 502 before the compensating RF signal is added to the DC signal and is provided to the DC electrode 412. In some embodiments, the capacitors of the capacitor bank 704 may have binary weightings, but in other embodiments, the capacitors may have different weights determined according to circuit or system requirements. Thus, in an embodiment, a constant base compensating RF signal may be generated for multiple DC electrodes, and each DC electrode 412 may have a switching matrix 706 and capacitor bank 704 to tune the constant base compensating RF signal for the individual DC electrode 412.

In some embodiments, the coupling compensations system 410 includes a compensation connection controller 702 that controls the switching matrix 706 to connect the auxiliary resonator 502 through the capacitor bank 704. In some embodiments, the compensation connection controller 702 may be one or more latches that are set or programmed at a startup of the overall system, and that turn transistors in the switching matrix 706 on or off to provide connections through selected capacitors in the capacitor bank 704.

The DC source 408 may be connected to the DC electrode 412 to provide a desired DC voltage to a selected DC electrode 412. In some embodiments, the DC source 408 may connect directly to the DC electrode 412. In other embodiments, one or more optional elements, such as an amplifier 602, or a switching system (not shown), or the like may be disposed between the DC source 408 and the DC electrode 412 to modify the signal from the DC source, route the signal to an appropriate DC electrode 412, or otherwise manage or process the signal from the DC source 408.

In some embodiments, the switching matrix 706 and capacitor bank 704 may connect the auxiliary resonator 502 directly to the DC electrode 412. However, in other embodiments, the amplifier 602 may be between the DC electrode 412 and the capacitor bank 704, however the amplifier may cause a phase shift in the compensating RF signal provided by the auxiliary resonator 502, and the phase control may be configured to cause the auxiliary resonator 502 to provide the base compensating RF signal with a phase that is 180 degrees out of phase with the RF signal provided by the RF source 402, and further with a phase adjustment to correct for the phase shift introduced by the amplifier 602.

In another embodiment, the coupling compensation system 410 may omit the auxiliary resonator 502 and phase control 504, and may couple the DC electrode 412 to the RF source 402 to provide, to the DC electrode 412, an RF signal selected as a compensating RF signal to compensate for the capacitive coupling 406. Thus, the coupling compensation system 410 may connect the RF source to the switching matrix 706 so that the capacitor bank 704 attenuates the RF signal to generate the desired compensating RF signal before the compensating RF signal is added to the DC signal and is provided to the DC electrode 412.

Figure 8:
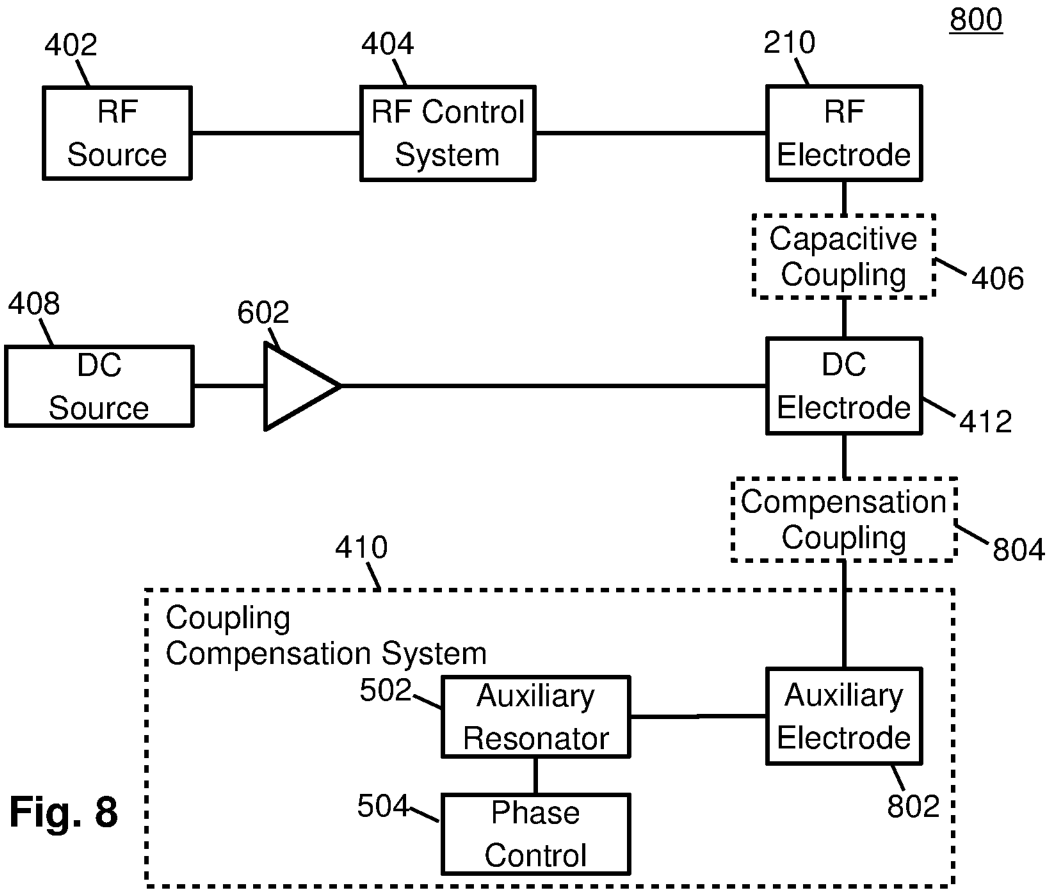
FIG. 8 is a logical diagram illustrating an electrode arrangement with an auxiliary electrode coupling compensation system according to some embodiments.

FIG. 8 is a logical diagram illustrating an electrode arrangement 800 with an auxiliary electrode 802 coupling compensation system 410 according to some embodiments. In some embodiments, a coupling compensation system 410 may include an auxiliary resonator 502 that provides a compensating RF signal to an auxiliary electrode 802 that is separate from the DC electrode 412 and from the RF electrode 218. The compensating RF signal provided to the auxiliary electrode 802 may be provided with an amplitude and phase that provide compensation coupling 804 between the auxiliary electrode 802 and the DC electrode 412. The compensation coupling 804 may be capacitive coupling that effectively compensates for the capacitive coupling 406 between the RF electrode 218 and the DC electrode 412.

In another embodiment, the coupling compensation system 410 may omit the auxiliary resonator 502 and phase control 504, and may couple the DC electrode 412 to the RF source 402 to provide, to the auxiliary electrode 802, an RF signal selected as a compensating RF signal to compensate for the capacitive coupling 406. Thus, the coupling compensation system 410 may connect the RF source 402 to the auxiliary electrode 802 to generate the compensation coupling 804.

Figure 9:
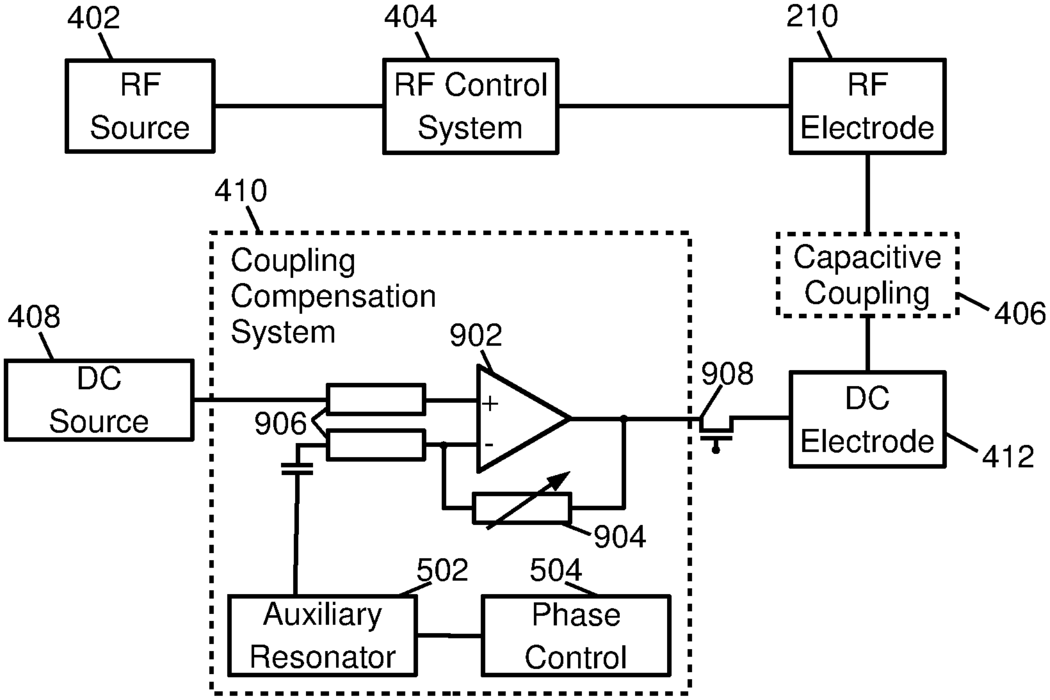
FIG. 9 is a logical diagram illustrating an electrode arrangement with an amplifier-based coupling compensation system according to some embodiments.

FIG. 9 is a logical diagram illustrating an electrode arrangement with an amplifier-based coupling compensation system 410 according to some embodiments. In some embodiments, a coupling compensation system 410 may include an auxiliary resonator 502 and phase control element 504 that are coupled to a DC electrode 412 through an amplifier 902. The amplifier 902 may be an inverting amplifier uses the compensating RF signal as an input, and modulates and amplifies the DC signal from the DC source 408 by the compensating RF signal. In such an arrangement, a feedback resistor 904 may be a variable resistor to provide an adjustable gain, where input resistors 906 are substantially constant.

The coupling compensation system 410 may connect to the DC electrode 412 through one or more switches 908. In some embodiments, the one or more switches 908 may be a switching matrix that routes or connects the combination of the DC signal and compensating RF signal to selected DC electrodes 412 to provides a shuttling or keeping voltage that has a compensation RF component provided by the auxiliary resonator 502.

In another embodiment, the coupling compensation system 410 may omit the auxiliary resonator 502 and phase control 504, and may couple the RF source 402 to an input resistor 906 or directly to the amplifier 902. Thus, the coupling compensation system 410 may connect the RF source 402 to the auxiliary electrode 802 to provide the compensating RF signal from the RF source 402.

Figure 10A:
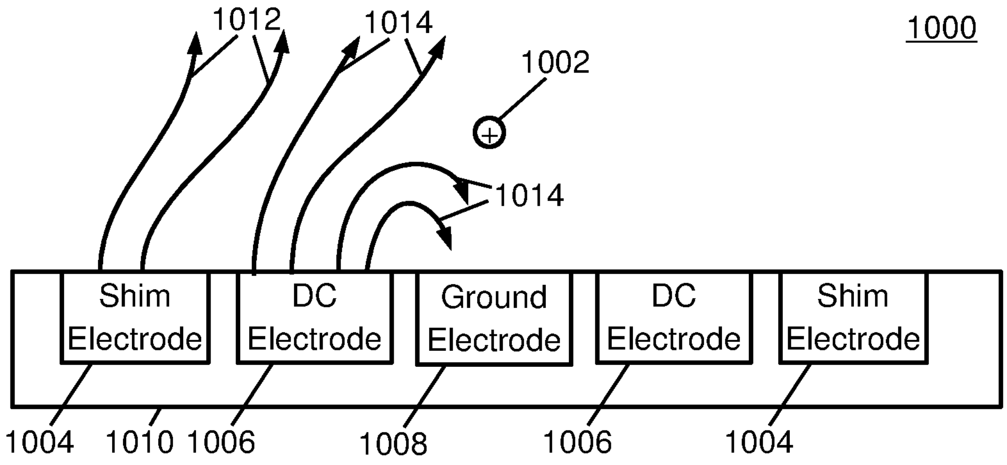
FIGS. 10A and 10B are a logical diagrams illustrating an electrode arrangement with a shim electrode according to some embodiments.

FIG. 10A is a logical diagram illustrating an electrode arrangement 1000 with a shim electrode 1004 according to some embodiments. In some embodiments, an ion 1002 may be confined or contained over a substrate 1010 by an RF field provided by RF electrodes (not shown). DC electrodes 1006 may provide a DC field 1014 such as a keeping field or shuttling field, which is grounded by a ground electrode 1008. Shim electrodes 1004 may be provided, and a shim voltage may be applied to the shim electrodes 1004 to generate a shim RF field 1012 that causes an RF field at the position of the ion 1002 to compensate for the RF field caused by DC electrodes due to capacitive coupling with adjacent RF electrodes. The shim voltage may, in some embodiments, be an RF field that compensates the variations in the DC field that are created by the RF field. Using a shim electrodes 1004 avoids using a capacitance between the shim electrode 1004 and the DC electrode 1006, because there is no substantial direct interaction between the DC electrodes 1006 and shim electrodes 1004. Instead, the shim electrodes 1004 would rather compensate for the capacitive coupling between the RF electrode and the DC electrode 1006 by providing an E-field at the position of the ion 1002 by providing an additional E-field that compensates for the disturbing signal on the DC electrode at the position of the ion. The coupling compensation system 410 may be formed in accordance with any of the above-referenced FIG. 4A-9.

Figure 10B:
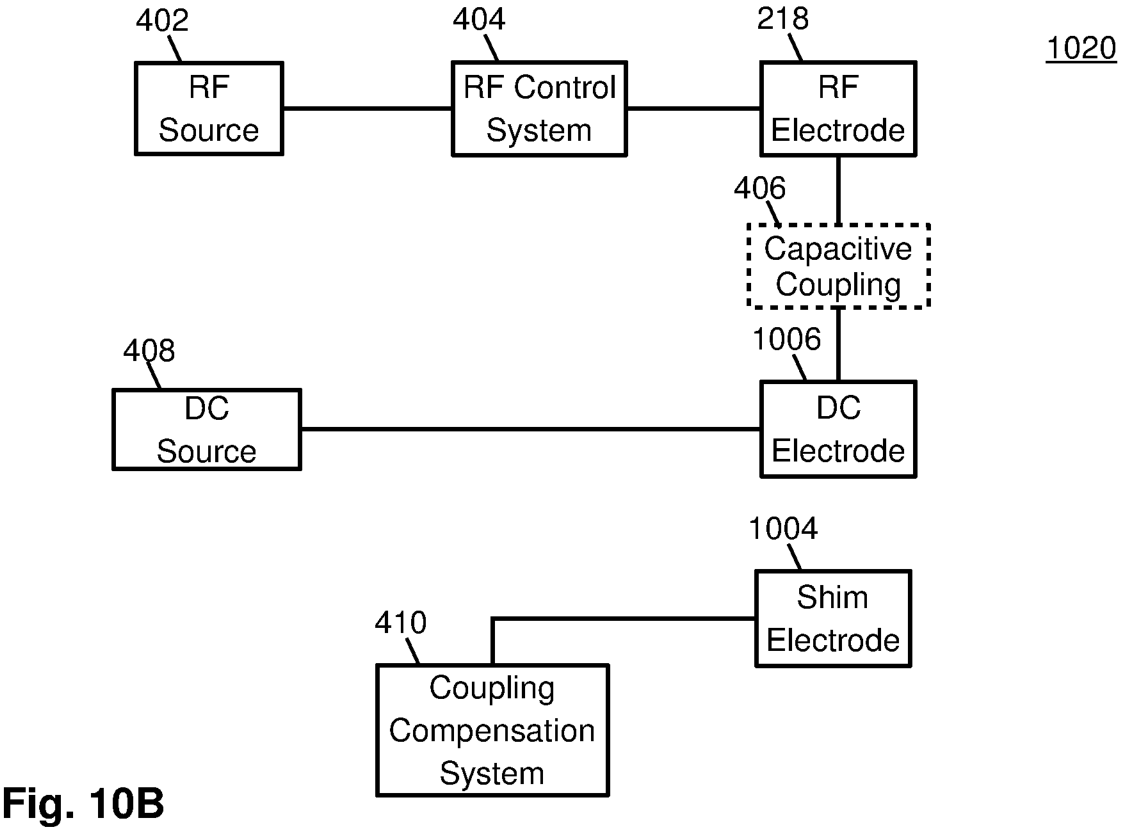

FIG. 10B is a logical diagram illustrating an electrode arrangement 1020 with a shim electrode 1004 according to some embodiments. In some embodiments, an RF source 402 generates an RF signal, and the RF signal is routed to an RF electrode 218 by an RF control system 404. The electrode arrangement 1020 may further have a DC source 408 that provides a DC voltage to an associated DC electrode 1006 that may be subject to capacitive coupling with the RF electrode 218.

A shim electrode 1004 separate from the DC electrode 1006 may be provided in the electrode arrangement 1020, and the shim electrode 1004 may be used to provide an E-field that modifies or adjusts the E-field in the region of an ion to compensate for inaccuracies in the E-field induced by the capacitive coupling between the RF electrode 210 and the DC electrode 1006. A coupling compensation system 410 may be connected to the DC electrode 412 to provide a signal that compensates for the capacitive coupling 406. Thus, the coupling compensation system 410 may provide an AC or RF signal that is associated with the RF signal provided by the RF source 402. The coupling compensation system 410 may have an auxiliary resonator (not shown), may use an RF signal provided by the RF source 402 as a compensating RF signal, or may generate another RF signal that is tuned for adjustment of the DC field.

Figure 11:
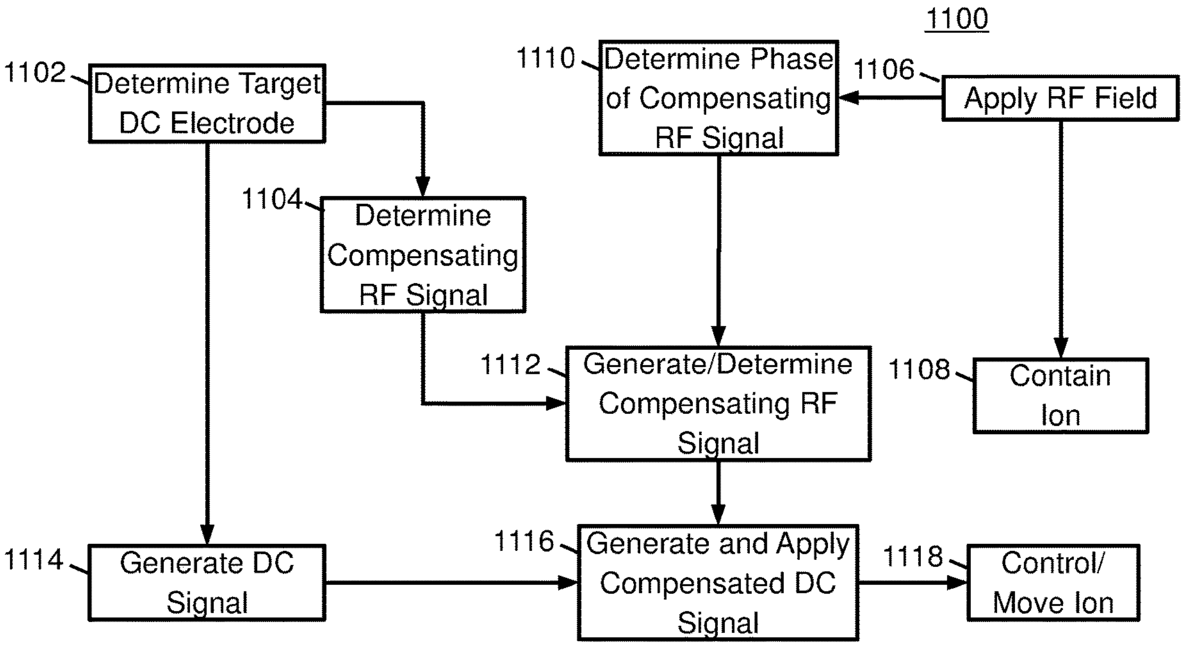
FIG. 11 is a flow diagram illustrating a method for providing capacitive coupling compensation according to some embodiments.

FIG. 11 is a flow diagram illustrating a method 1100 for providing capacitive coupling compensation according to some embodiments. In block 1102, a target DC electrode is determined. The target DC electrode may be determined by a control system such as a compensation control system or the like, or may be determined by a shuttling or other DC electrode control system. The target DC electrode may, in some embodiments, may be a DC electrode to which a DC signal may be applied.

In block 1106, an RF field may be applied. In some embodiments, the RF field may be applied to an RF electrode by an RF source. In block 1108, an ion may be contained by an ion trap system, and in particular, the ion may be contained at least partially by the applied RF field. Containing the ion may include maintaining an ion over a desired location or element. Application of the RF field and containment of the ion may result in a capacitance being induced between the RF electrode and the target DC electrode.

In block 1104, a compensating RF field may be determined. In some embodiments, the compensating RF field may be predetermined according to the location and a predetermined value of the RF field. In other embodiments, the compensating RF field may be determined dynamically, for example, by a monitoring system that monitors a capacitance of the target DC electrode, movement, heating, vibration, positioning, or other characteristics of the ion, according to environmental factors, or other parameters. Determining the compensating RF field may include determining a magnitude of the RF field, which may be similar to, proportional to, related to, or otherwise associated with, the magnitude of the RF field, or according to other parameters of the RF field. For example, the magnitude of the compensating RF field may be less than the magnitude of the RF field, as the geometry of the RF electrodes and DC electrodes may be such that the RF field does not create a perfect capacitive coupling.

In block 1110, the phase of the compensating RF signal is determined. In some embodiments, the phase of the compensating RF signal may be phase locked with the phase of the RF signal, and may be phase locked to be 180 degrees out of phase with the phase of the RF signal. In some embodiments, the phase of the compensating RF signal may be adjusted from being 180 degrees out of phase with the phase of the RF signal to account for phase shifting by amplifiers, or other elements in the compensation or DC circuits, or to provide an RF field that compensates for the capacitive coupling between the RF electrode and the target DC electrode.

In block 1112, the compensating RF signal is determined or generated. In some embodiments, the compensating RF signal may be generated by an auxiliary resonator such as an RF source, or the like. In some embodiments, the compensating RF signal may be generated by using the RF signal provided by the RF source and adjusting the phase and amplitude according to the determined phase and amplitude needed for the compensating RF signal. In other embodiments, a compensating signal from an RF source may be identified. For example, a compensating RF signal may be identified as being provided by an RF source that provides an RF signal having a desired phase that cancels the signal causing the capacitive coupling.

In block 1114, the DC signal is generated. The DC signal may be a DC compensation signal, and shuttling signal, a keeping signal or another DC signal. The DC signal may be generated according to the target DC electrode, and, in some embodiments, according to the positioning, or desired movement of the ion. The DC signal may in some embodiments, be a transient or varying signal generated as part of a voltage profile used for shutting an ion, or may be substantially constant DC signal. In block 1116, the compensated DC signal is generated and applied to the target DC electrode. In some embodiments, the compensated DC signal has a DC component from the DC signal, and an AC or RF component from the compensating RF signal. Thus, the compensated DC signal may have an AC or RF component that is associated with the RF signal. The compensated DVC signal may be generated by injecting the compensating RF signal into the DC signal by, for example, a bias tee or a switching matrix, by adding the compensating RF signal to the DC signal, by modulating the DC signal by the compensating RF signal using an amplifier, or the like. In block 1118 an ion is controlled or moved using the compensated DC signal.

An embodiment ion trap system includes a substrate, a radio frequency (RF) source configured to provide an RF signal, an RF electrode disposed in the substrate and connected to the RF source, a direct current (DC) source configured to provide a DC signal, a DC electrode disposed in the substrate and connected to the DC source, wherein the DC electrode is separate from the RF electrode, and a coupling compensation system configured to provide a compensating RF signal associated with the RF signal.

In some embodiments, the coupling compensation system includes an auxiliary resonator configured to generate the compensating RF signal. In some embodiments, the compensating RF signal is at least one of generated based on the RF signal or provided from at least a portion of the RF source. In some embodiments, the coupling compensation system comprises an auxiliary electrode separate from the DC electrode and the RF electrode, wherein the coupling compensation system is configured to provide the compensating RF signal to the auxiliary electrode. In some embodiments, the coupling compensation system is configured to provide the compensating RF signal to the DC electrode. In some embodiments, the ion trap system further comprises a shim electrode separate from the DC electrode, where the coupling compensation system is configured to provide the compensating RF signal to the shim electrode. In some embodiments, the coupling compensation system includes a phase control element configured to set a phase of the compensating RF signal according to a phase of the RF signal. In some embodiments, the phase control element is configured to set a phase of the compensating RF signal to be about 180 degrees out of phase with the phase of the RF signal. In some embodiments, the coupling compensation system includes a bias tee configured to provide the compensating RF signal associated to the DC electrode. In some embodiments, the coupling compensation system includes an amplifier configured to provide the compensating RF signal associated to the DC electrode. In some embodiments, the coupling compensation system comprises an amplifier, and a phase control element configured to set a phase of the compensating RF signal according to a phase of the RF signal, where DC source is connected to the DC electrode through the amplifier, and the RF source is connected to the DC electrode through the amplifier. In some embodiments, the coupling compensation system comprises a capacitor bank configured to modify the compensating RF signal and to provide a modified compensating RF signal to the DC electrode.

An embodiment system includes a radio frequency (RF) electrode configured to provide an RF field in response to a received RF signal, where the RF field is configured to confine an ion, a direct current (DC) source configured to provide a DC signal, where the DC signal is configured to perform at least one of controlling or moving the ion, a coupling compensation system configured to provide a compensating RF signal associated with the RF signal, and a DC electrode connected to the coupling compensation system and connected to the DC source, where the DC electrode is separate from the RF electrode, and where the DC electrode is configured to provide a DC field according to the compensating RF signal and further according to the DC signal, and where the DC field is compensated, according to the compensating RF signal, for a capacitive coupling between the RF electrode and the DC electrode induced by the RF field.

In some embodiments, the coupling compensation system includes an auxiliary resonator connected to the DC electrode. In some embodiments, the coupling compensation system further includes a phase control element configured to set a phase of the compensating RF signal according to a phase of the RF signal. In some embodiments, the phase control element configured to set a phase of the compensating RF signal to be about 180 degrees out of phase with the phase of the RF signal. In some embodiments, the coupling compensation system further includes a capacitor bank configured to modify the compensating RF signal and to provide a modified compensating RF signal to the DC electrode.

An embodiment method includes applying a radio frequency (RF) field to an RF electrode to contain an ion in an ion trap system, determining a target direct current (DC) electrode of the ion trap system, determining a compensating RF signal associated with the RF signal, generating the compensating RF signal, applying the compensating RF signal to the target DC electrode wherein the compensating RF signal results in a DC field that is compensated for capacitive coupling between the RF electrode and the target DC electrode, and performing, using the compensating RF signal, at least one of controlling or moving an ion.

In some embodiments, the compensating RF signal is applied to the target DC electrode. In some embodiments, the phase of the compensating RF signal is about 180 degrees out of phase with a phase of the RF signal. In some embodiments, the method further includes generating a DC signal, and generating a compensated DC signal according to the DC signal and the compensating RF signal, and the performing at least one of controlling or moving the ion includes performing, using the compensated DC signal, the at least one of controlling or moving the ion.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An ion trap system, comprising:
a substrate;
a radio frequency (RF) source configured to provide an RF signal;
an RF electrode disposed in or on the substrate and connected to the RF source;
a direct current (DC) source configured to provide a DC signal;
a DC electrode disposed in or on the substrate and connected to the DC source, wherein the DC electrode is separate from the RF electrode; and
a coupling compensation system configured to provide, to a target electrode separate from, and different than, the RF electrode, a compensating RF signal associated with the RF signal, wherein the compensating RF signal is associated with a capacitive coupling induced by an RF field between the RF electrode and the DC electrode.

2. The ion trap system of claim 1, wherein the coupling compensation system comprises an auxiliary resonator configured to generate the compensating RF signal.

3. The ion trap system of claim 1, wherein the compensating RF signal is at least one of generated based on the RF signal or provided from at least a portion of the RF source.

4. The ion trap system of claim 1, wherein the coupling compensation system comprises an auxiliary electrode separate from the DC electrode and the RF electrode, wherein the coupling compensation system is configured to provide the compensating RF signal to the auxiliary electrode.

5. The ion trap system of claim 1, wherein the coupling compensation system is configured to provide the compensating RF signal to the DC electrode.

6. The ion trap system of claim 1, wherein the ion trap system further comprises a shim electrode separate from the DC electrode, wherein the coupling compensation system is configured to provide the compensating RF signal to the shim electrode.

7. The ion trap system of claim 1, wherein the coupling compensation system comprises a phase control element configured to set a phase of the compensating RF signal according to a phase of the RF signal.

8. The ion trap system of claim 7, wherein the phase control element is configured to set a phase of the compensating RF signal to be about 180 degrees out of phase with the phase of the RF signal.

9. The ion trap system of claim 1, wherein the coupling compensation system comprises a bias tee configured to provide the compensating RF signal associated to the DC electrode.

10. The ion trap system of claim 1, wherein the coupling compensation system comprises an amplifier configured to provide the compensating RF signal associated to the DC electrode.

11. The ion trap system of claim 1, wherein the coupling compensation system comprises an amplifier, and a phase control element configured to set a phase of the compensating RF signal according to a phase of the RF signal; and
wherein the DC source is connected to the DC electrode through the amplifier, and wherein the RF source is connected to the DC electrode through the amplifier.

12. The ion trap system of claim 1, wherein the coupling compensation system comprises a capacitor bank configured to modify the compensating RF signal and to provide a modified compensating RF signal to the DC electrode.

13. A system, comprising:
a radio frequency (RF) electrode configured to provide an RF field in response to a received RF signal, wherein the RF field is configured to confine an ion;
a direct current (DC) source configured to provide a DC signal, wherein the DC signal is configured to perform at least one of controlling or moving the ion;
a coupling compensation system configured to provide a compensating RF signal associated with the RF signal; and
a DC electrode connected to the coupling compensation system and connected to the DC source, wherein the DC electrode is separate from the RF electrode, wherein the DC electrode is configured to provide a DC field according to the compensating RF signal and further according to the DC signal, and wherein the DC field is compensated, according to the compensating RF signal, for a capacitive coupling between the RF electrode and the DC electrode induced by the RF field.

14. The system of claim 13, wherein the coupling compensation system comprises an auxiliary resonator connected to the DC electrode.

15. The system of claim 14, wherein the coupling compensation system further comprises a phase control element configured to set a phase of the compensating RF signal according to a phase of the RF signal.

16. The system of claim 15, wherein the phase control element configured to set a phase of the compensating RF signal to be about 180 degrees out of phase with the phase of the RF signal.

17. The system of claim 13 wherein the coupling compensation system further comprises a capacitor bank configured to modify the compensating RF signal and to provide a modified compensating RF signal to the DC electrode.

18. A method, comprising:
applying a radio frequency (RF) field to an RF electrode to contain an ion in an ion trap system;
determining a target direct current (DC) electrode of the ion trap system;
determining a compensating RF signal associated with the RF signal;
generating the compensating RF signal;
applying the compensating RF signal to the target DC electrode wherein the compensating RF signal results in a DC field that is compensated for capacitive coupling between the RF electrode and the target DC electrode; and
performing, using the compensating RF signal, at least one of controlling or moving an ion.

19. The method of claim 18, wherein the compensating RF signal is applied to the target DC electrode.

20. The method of claim 18, wherein a phase of the compensating RF signal is about 180 degrees out of phase with a phase of the RF signal.

21. The method of claim 18, further comprising:
generating a DC signal; and
generating a compensated DC signal according to the DC signal and the compensating RF signal; and
wherein the performing at least one of controlling or moving the ion comprises performing, using the compensated DC signal, the at least one of controlling or moving the ion.

* * * * *